United States Patent [19]

Theissig et al.

[11] 4,256,422

[45] Mar. 17, 1981

[54] DRILLING MACHINE WITH A DRILLING STOP

[75] Inventors: Werner Theissig; Gerhard Teger, both of Munich, Fed. Rep. of Germany

[73] Assignee: Hilti Aktiengesellschaft, Schaan, Liechtenstein

[21] Appl. No.: 60,235

[22] Filed: Jul. 24, 1979

[30] Foreign Application Priority Data

Jul. 24, 1978 [DE] Fed. Rep. of Germany ....... 2832429

[51] Int. Cl.³ .................... B23B 49/00; B23B 45/14
[52] U.S. Cl. ............................ 408/241 S; 173/21; 403/107; 408/14; 408/113
[58] Field of Search ............ 408/14, 113, 241 S; 403/106, 107, 377; 173/21; 279/19.1, 77

[56] References Cited

U.S. PATENT DOCUMENTS 4,113,404  9/1978  Lippacher et al. ............... 408/241 S Primary Examiner—Z. R. Bilinsky
Attorney, Agent, or Firm—Toren, McGeady and Stanger

[57] ABSTRACT

In a drilling machine, a rod-like stop member is mounted on the machine housing for limiting the extent to which a tool held in the machine can drill into a receiving surface. A handle lever, fitted on the housing, releasably locks the stop member in the desired position. The handle lever is pivotally mounted on the housing and has a specially shaped end surface which, in cooperation with a pressure plate, affords the locking engagement with the stop member. The locking engagement is provided by corrugated surfaces on the pressure plate and the stop member. The specially shaped end surface assures that the locked engagement cannot be released until a form-locking engagement between the pressure plate and stop member is overcome.

9 Claims, 11 Drawing Figures

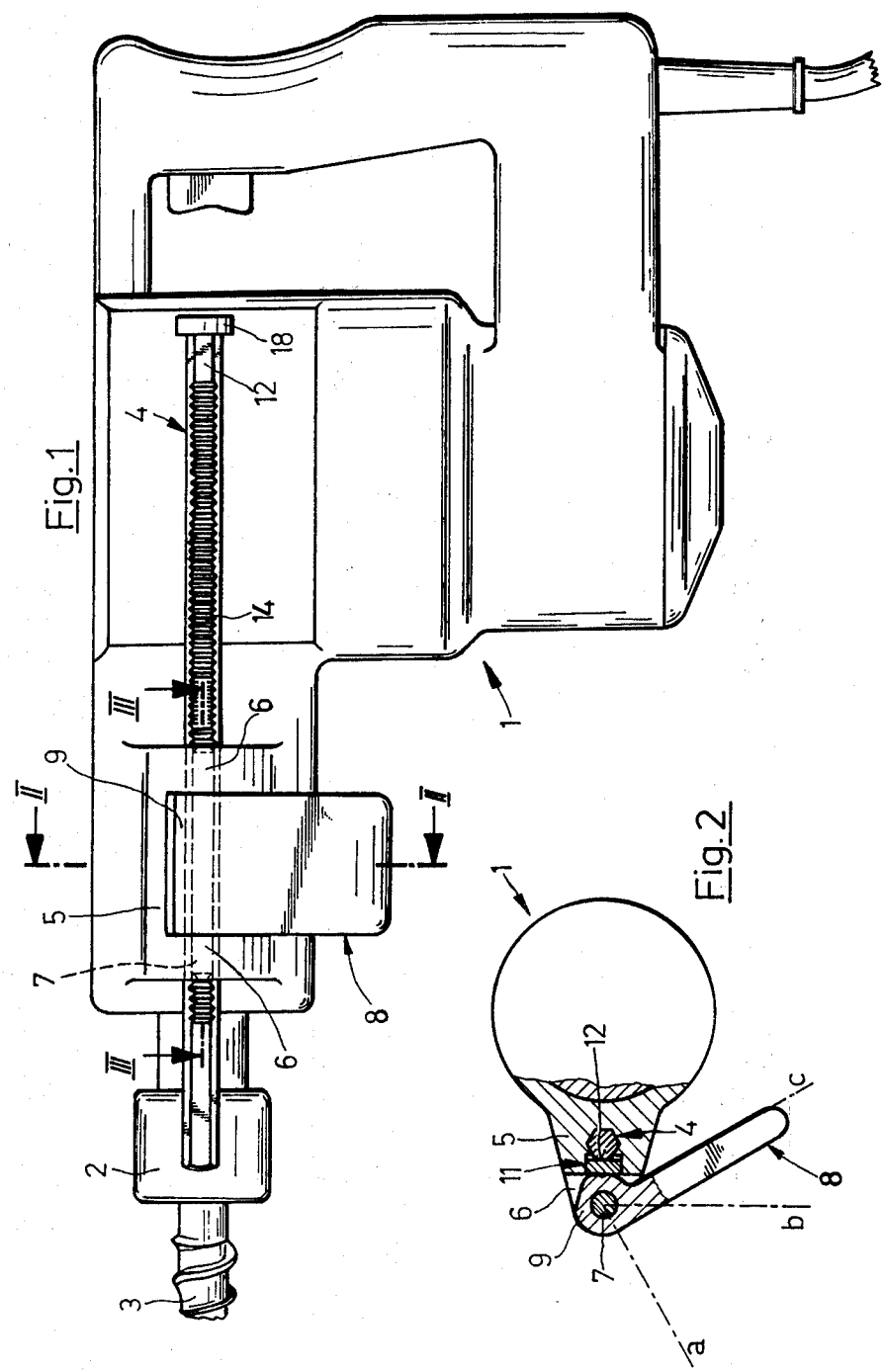

DRILLING MACHINE WITH A DRILLING STOP

SUMMARY OF THE INVENTION

The present invention is directed to a drilling machine with a rod-like stop member for limiting the depth to which a hole can be drilled. The rod-like stop member is supported on the machine housing and is movable longitudinally relative to the drilling axis of the machine. A handle, pivotally secured on the machine, releasably locks the stop member in the desired position.

In a known drilling machine, a rod-like stop for limiting the depth of the drilling operation is provided with a round cross-section, the stop is movably guided parallel to the drilling axis in two bearing lugs on the machine housing. An eccentric lever is located between the bearing lugs with the stop extending through the lever. The lever is pivotally mounted. When the eccentric lever is pivoted toward the machine housing, its eccentric gripping surface is guided toward the surface of the machine housing and effects a holding action on the stop extending through the bearing lugs. Accordingly, the position of the stop is fixed based on the frictional engagement developed.

This arrangement has the disadvantage that the gripping force increases as the eccentric lever moves closer into frictional engagement. The highest locking pressure is obtained at the end point in the movement of the lever toward the machine housing. The eccentric lever is supposed to maintain this position due to the self-locking action achieved. The high locking force developed results in high pressures acting on the faces of the holes in the bearing lugs and, thus, in addition to fatigue, premature wear of the parts occurs. Accordingly, after a relatively short period of use of the drilling machine applying percussion energy, the locking force of the eccentric lever is no longer sufficient to fix the stop in the desired position. It is not possible to increase the locking force by pivoting the lever further toward the machine housing, since the end point of the pivotal movement has already been reached.

Moreover, there is the additional problem of providing a reliable fixing action for the stop, since the stop has a circular cross-section and a smooth exterior surface and the locking action must be effected exclusively through frictional engagement.

Therefore, it is the primary object of the present invention to provide a drilling machine with a rod-like stop member for limiting the depth to which the machine can drill into a receiving material with the stop member being releasably locked by a lever handle which affords simple manipulation in effecting the locking and releasing actions and also assures a permanent locking action.

In accordance with the present invention, a corrugated surface is provided on a member cooperating with the handle lever so that the corrugated surface can be displaced into contact with the stop member for limiting its axial or longitudinal mobility. Further, a circumferentially continuous surface is provided on one end of the handle lever which is movable along an arc relative to the corrugated member for selectively displacing the member into contact with the stop member. The circumferentially continuous surface has portions with different radial dimensions from the pivot axis of the handle lever for effecting the releasing or locking action on the stop member. One part of the surface has the maximum radial dimension from the pivot axis and the surface which effects the locking action has a smaller radial dimension. After the locking action has been effected the handle must be pivoted so that the location of the maximum radial dimension is overcome before the stop member is released.

Advantageously, the corrugated surface on the member located between the handle lever and the stop member is formed as a toothed section, similar to a knurled surface, with the crests of the teeth extending in a direction perpendicular to the longitudinal or axial direction of the stop member.

The handle lever is supported independently from the stop member. The member with the corrugated surface cooperating with the handle lever can be pressed against the surface of the stop by pivoting the handle lever. During such pivotal movement into the locking position, the corrugated surface is pressed against the stop member which may be formed of a plastics material so that the locking action on the stop is achieved through a form-locking engagement.

Depending on the degree of deformability of the material forming the stop member, the indentations created by the corrugated surface on the member cooperating with the eccentric handle remains partially or completely in the stop member surface so than an oppositely disposed toothed corrugated section is provided on the stop member for assisting in the next locking engagement. The handle lever is released in a known manner after which the stop member is freely movable.

Furthermore, by providing the locking surface on the end of the handle lever spaced circumferentially from the location of the maximum radial dimension, a locking effect for the handle lever itself can be achieved. In addition, since the usual locking force is less than the maximum locking force provided by the location of the maximum radial dimension from the pivot axis, the force acting on the stop member during normal locking engagement has a positive effect on the wear of the various parts involved and also on the service life expectancy of such parts.

To provide the highest load capacity for locking the stop member, the corrugation surface is provided on a pressure plate located in the locking position between the end surface of the handle lever and the adjacent surface of the stop member. With this arrangement it is possible to keep the wear of the pressure plate to a minimum since the surface of the pressure plate which contacts the stop member is relatively very large.

The pressure plate cooperates with the handle lever, that is, on one hand, the pressure plate is displaced toward the stop member by the handle lever and, on the other hand, it is supported in parallel relation with the drilling axis of the machine in juxtaposition to the handle lever. This latter feature is achieved in a simple manner by locating the pressure plate in a recess of the machine housing so that the recess forms a cage for the plate.

In another embodiment of the present invention, the stop member can be locked in a simple manner by providing the corrugated surface on the end surface of the handle lever which effects the locking action. Such an arrangement is particularly advantageous in respect to its design without losing any of the above-mentioned functional properties.

Preferably, the handle lever is constructed as a pivotal or swing lever as distinguished from an eccentric wheel. The use of a swing lever ensures simple operation, since the handle lever can be moved into and out of the locking position in a single operation. Moreover, the handle lever can be arranged so that is does not protrude laterally beyond the machine housing in the locking position, since any projecting surface might create an obstacle to efficient operation.

Preferably, the stop member has a polygonal rod-like shape with the side surface juxtaposed to the pressure plate and handle lever being corrugated. A square of hexagonal rod cross section would be particularly suitable, since with such a shape the side surfaces are relatively large so that the locking action can be achieved with relatively little if any wear. Unlike a round rod, one with a polygonal cross-section has the advantage that is can be guided in correspondingly shaped bearings so that a separate part for preventing rotation of the stop member is not required.

Wear of the stop member occurring during repeated locking engagement with the corrugated surface on the pressure plate is reduced by providing a complementary corrugated shape in the surface of the stop member with which the locking action is effected. Accordingly, a form-fitting locking engagement of the corrugated surface associated with the handle lever is achieved during the movement of the lever without any resulting deformation of the material forming the corrugated surfaces. In arranging the path of movement of the handle lever into locking engagement with the stop member, it must be ensured that the corrugated surface associated with the lever in the released or unlocked position is displaced from engagement with the stop member for facilitating axial movement of the stop member. The shape of the corrugated surface associated with the handle lever is selected so that there is no self-locking effect developed when the stop member is locked which would prevent movement of the unlocked stop member. Such a self-locking effect is provented by providing the sides or flanks of the corrugated surfaces disposed at about 45° to the drilling axis of the machine or to the axis of the stop member. In such an arrangement an angle of about 90° is formed between the sides or flanks of the teeth or ridges forming the corrugated surface.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view of a drilling machine including a stop member for limiting the depth of the drilling operation, with the stop member in the locked position;

FIG. 2 is a transverse view, partly in section, taken along the line II—II in FIG. 1;

DETAIL DESCRIPTION OF THE INVENTION

Figure 3:
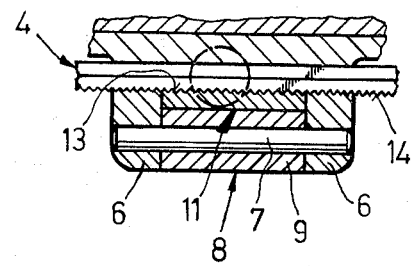
FIG. 3 is a sectional view through the stop member taken along the line III—III in FIG. 1.

In FIG. 1 a drilling machine housing 1 is illustrated with a tool holder 2 projecting outwardly from its front end and with a drill bit 3 mounted in the holder. A stop member 4 for limiting the depth the drill bit 3 can extend into a receiving material, is supported in a projection 5 extending laterally outwardly from the side of the housing 1. A pair of bearing lugs 6 project outwardly from the opposite ends of the projection 5 and support the opposite ends of a bearing bolt 7. As can be seen best in FIG. 2, a handle lever 8 is pivotally mounted on the bearing bolt and includes a head 9 at one end adjacent to the stop member 4 extending through the projection 5. The bearing bolt 7 extends through the center of the head 9.

In FIG. 2 the various positions of the handle lever 8 are shown in dot-dash lines a, b and c with the normal locked position illustrated by the line c. In the position illustrated in FIG. 2, the head 9 presses inwardly against a pressure plate 11 which, in turn, bears against a side surface 12 of the stop member 4. The side surface 12 faces toward the pressure plate. With the pressure plate 11 bearing inwardly against the side surface 12 of the stop member 4, as can be seen in FIG. 3, a corrugated surface 13 on the pressure plate interengages a corresponding corrugated surface 14 on the stop member providing a form-locking engagement between the two parts. With such interengagement, the stop member 4 is securely fixed, that is, it cannot move in the direction of the drilling axis.

Figure 2A:
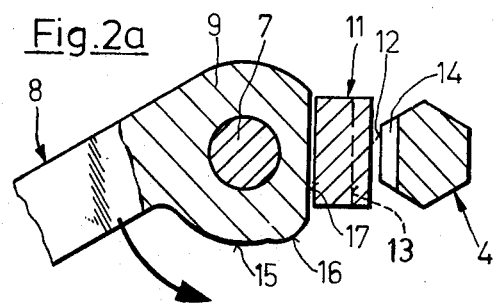
FIGS. 2a, 2b and 2c are enlarged sectional views, similar to the view in FIG. 2, each showing a different operating position of the parts for locking the stop member.
Figure 3A:
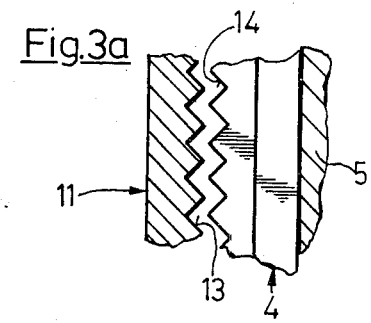
FIGS. 3a, 3b and 3c are enlarged detail views of the circled portion in FIG. 3 showing the position of the parts corresponding to the operating positions shown in FIGS. 2a, 2b, and 2c.
Figure 2B:
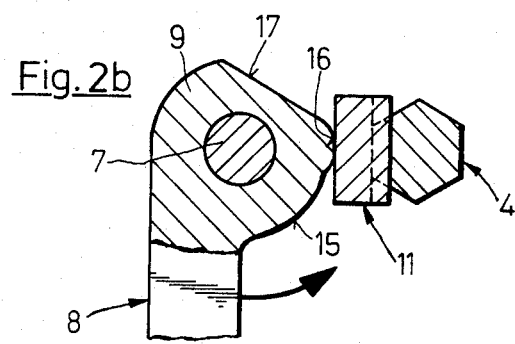
Figure 3B:
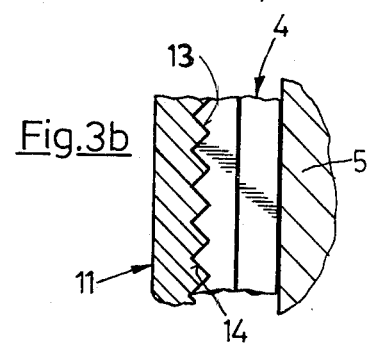
Figure 2C:
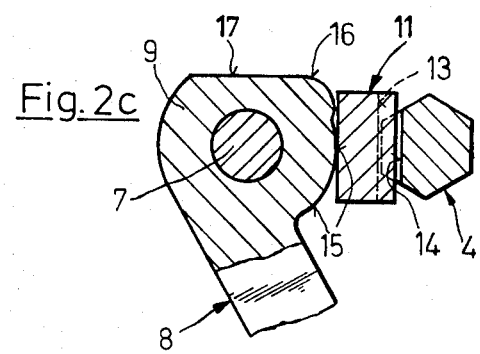
Figure 3C:
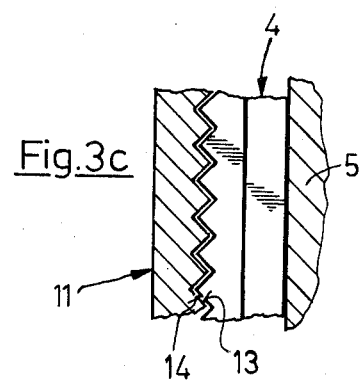

The shape of the head 9 and its interaction with the pressure plate 11 and indirectly with the stop member 4 are illustrated in FIGS. 2a, 2b and 2c with the remaining parts of the drilling machine omitted. FIGS. 2a, 2b and 2c show the different operating positions of the handle lever indicated by the dot-dash lines a, b and c in FIG. 2 with line a corresponding to FIG. 2a, line b to FIG. 2b and line c to FIG. 2c. Similarly, FIGS. 3a, 3b and 3c show an enlarged portion of the circled part of FIG. 3 indicating the relationship of the pressure plate 11 and the juxtaposed surface of the stop member 4 in the various operating positions of the handle lever. FIGS. 3a, 3b and 3c correspond to the positions shown in FIGS. 2a, 2b and 2c, respectively.

In FIG. 2a the head 9 extends around the bearing bolt 7. The circumferential surface of the head extending around the bearing bolt 7 is basically circular note the circular configuration of the head extending from the rectilinear sides of the handle. As indicated in FIG. 2c, a circular section 15 of the head clamps the pressure plate against the stop member in the normal locked position of the stop member. These circular surfaces extend concentrically around the bearing bolt 7. In addition, a projection 16 extends eccentrically outwardly from the surface 15 so that the projection 16 has the maximum radial dimension from the center of the bearing bolt, that is, its radial dimension is greater than the radial dimension of the surface 15. On the opposite side of the projection 16 from the surface 15, a planar surface 17 is provided extending chordally relative to the center of the bearing bolt and having a smaller dimension outwardly from the center of the bolt than either the surface 15 or the projection 16.

In the position shown in FIG. 2a, the handle lever 8 is swung or pivoted outwardly from the machine housing 1 with the planar surface 17 located opposite the pressure plate 11 and the space between the planar surface 17 and the side surface 12 of the stop member is greater than the thickness dimension of the pressure plate. Accordingly, the corrugated surface 13 of the pressure plate is in spaced relation to the opposed corrugated surface 14 on the side surface 12 of the stop member 4. Since the interengagement between the corrugated surfaces is released, the stop member is freely movable in its axial direction, that is, in the direction of the drilling axis of the drilling machine. In FIG. 3a, viewing the pressure plate and the stop member turned 90° relative to FIG. 2a, the spaced relation of the corrugated surfaces 13 and 14 can be clearly seen. The corrugated surfaces 13 and 14 have a saw-tooth like shape with the angle of inclination of the flanks of the teeth extending at 45° to the drilling axis or to the axis of the stop member.

When the handle lever 8 is pivoted from the released position illustrated in FIG. 2a in the direction of the arrow, that is, with the handle moving inwardly toward the housing 1, the projection 16 moves into contact with the surface of the pressure plate 11 and presses it against the side surface 12 of the stop member 4 so that the corrugated surfaces 13 and 14 are in tightly fitting interengagement without any play between the corrugated surfaces. With an appropriate design of the projection 16 relative to the surface 15, the two corrugated surfaces are clamped together.

The pressure exerted by the handle lever 8 against the pressure plate 11 for locking the stop member 4 can be reduced from that applied in FIG. 2b by pivoting the handle lever in the direction of the arrow about 30° so it assumes the position corresponding to the line c in FIG. 2. The position of the line c corresponds to FIGS. 2c and 3c. In pivoting the handle, the projection 16 extending radially outwardly from the adjacent surface 15, is displaced out of contact with the pressure plate 11 and the clamping surface contacts the pressure plate 11 and holds it against the stop member 4. Since the radial dimension of the surface 15 from the center of the bearing bolt 7 is slightly smaller than the maximum radial dimension to the outer surface of the projection 16, a slight amount of play is provided between the corrugated surface 13 on the pressure plate and the corresponding corrugated surface 14 on the stop member. Accordingly, the locking force is reduced and through a slight play exists between the corrugated surfaces 13, 14 the pressure plate and the stop member remain in locked interengagement.

The surfaces controlling the relative positions of the pressure plate 11 and the stop member 4 form a part of the circumferential surface of the head 9. The combination of the surface 15, the projection 16, and the planar surface 17 form a continuous circumferential part of the surface of the head 9 extending around the bearing bolt 7. In going from the released position illustrated in FIG. 2a to the normal locked position shown in FIG. 2c the continuous circumferential part moves relative to the outer surface of the pressure plate 11 varying the force displacing the pressure plate toward the stop member 4.

When the handle lever 8 is in the normal locked position displayed in FIGS. 2c, 3c, it can only be pivoted about the bearing bolt 7 by overcoming the increased force developed when the projection 16 contacts the pressure plate 11. Accordingly, the handle lever is locked in the position shown in FIG. 2c without any danger that it will pivot automatically into the released position shown in FIG. 2a. The forward movement of the stop member 4 is limited by the head 18 on its trailing end, note FIG. 1. To release the locking action, the handle lever 8 is pivoted in the direction opposite to the arrows shown in FIGS. 2a and 2b from the position shown in FIG. 2c back to that indicated in FIG. 2a.

Figure 4:
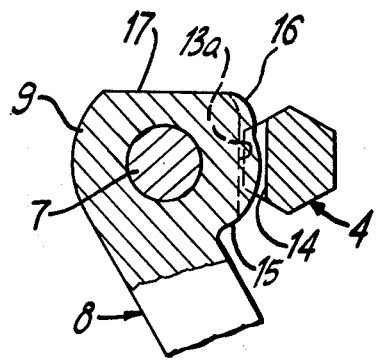
FIG. 4 is a cross sectional view affording a detailed illustration of another embodiment of the present invention shown in a position similar to that in FIG. 2c.
Figure 4A:
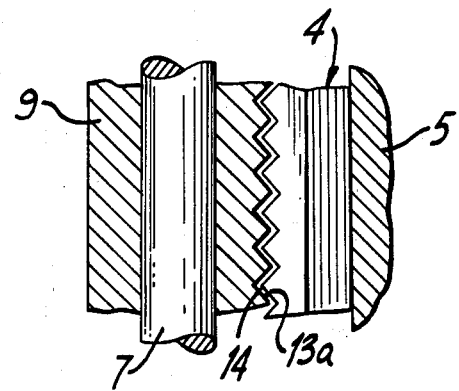
FIG. 4a is a cross sectional view of the embodiment shown in FIG. 4 with the parts rotated through 90°.

In FIGS. 4 and 4a another embodiment of the invention is shown which does not include the pressure plate 11 between the stop member 4 and the head 9 on the handle lever 8. In this embodiment, the head 9 on the handle lever 8 has a corrugation 13a extending in the region of the clamping surface 15 to the projection 16. By turning the handle lever in the direction of the arrows as shown in FIGS. 2a–2c, initially the corrugation 13a in the projection 16 reaches engagement with the corrugation 14 in the stop member 4 and, as explained above, holds the stop member 4 without any play. Subsequently, the swing lever reaches the end position corresponding to that shown in FIG. 2c with a locking contact providing by the corrugation 13a formed in the clamping surface 15, as shown in FIG. 4. FIG. 4a shows that, due to slight play, a pressure-free connection exists between the corrugations 13a and 14 in this position. The advantages of this embodiment correspond to those of the construction shown in the preceding figures, however, as mentioned above, in this arrangement the pressure plate 11 is not required.

While specific embodiments of the invention have been shown and described in detail to illustrate the application of the inventive principles, it will be understood that the invention may be embodied otherwise without departing from such principles.

What is claimed is:

1. Drilling machine comprising a housing having a front end and a rear end and also having a drilling axis extending in the front end-rear end direction, means on the front end of said housing for mounting a drilling tool, a stop member mounted on and extending in generally parallel relation with the drilling axis of said housing for limiting the depth a tool mounted in said housing can drill into a receiving surface, mens for releasably locking said stop member on said housing so that the position of said stop member can be adjusted, said stop member comprising an axially elongated rod-like member, wherein the improvement comprises a handle lever pivotally mounted on said housing and having one end of said handle lever located adjacent to said stop member, a corrugated surface in operative relation with said handle lever and disposed in juxtaposition to said stop member, the pivotal axis of said handle lever extending generally parallel to the axis of said stop member, the one end of said handle lever being pivotally displaceable through an arc between a first position where said stop member is in the released position and a second position where said stop member is in the locked position, the one end of said handle lever having a surface extending circumferentially around and spaced radially outwardly from the pivotal axis, a continuous circumferential part of said one end surface being pivotally displaceable relative to said stop member, the continuous circumferential part of said one end surface having a first portion which when it is positioned opposite said stop member the stop member is in the released position, a second portion having the maximum radial dimension from the pivotal axis for the continuous circumferential part so that when said second portion is spaced opposite said stop member it presses the corrugated surface against said stop member into tightly fitting engagement therewith, and a third portion having a radial dimension from the pivotal axis less than the maximum radial dimension of said second portion so that when it is spaced opposite said stop member it presses the corrugated surface into contact with said stop member for holding said stop member in the locked position and with the force exerted against said stop member being less than the force exerted by said second portion.

2. Drilling machine, as set forth in claim 1, wherein a pressure plate is mounted in said projection between said stop member and the one end surface of said handle lever, said corrugated surface located on the surface of said pressure plate facing toward said stop member, and said continuous circumferential portion of said one end surface of said handle lever being pivotally movable relative to said pressure plate for displacing said pressure plate into engagement with said stop member in the locked position of said stop member.

3. Drilling machine, as set forth in claim 1, wherein said corrugated surface is formed on the third portion of the continuous circumferential part of said one end surface of said handle lever.

4. Drilling machine, as set forth in claim 1, wherein said stop member has a polygonal cross-section with one side surface of the polygonal surface of said stop member facing toward said corrugation surface.

5. Drilling machine, as set forth in claim 4, wherein said side surface of said stop member facing toward said corrugated surface being similarly corrugated for effecting meshed interengagement therebetween in the locked position of said stop member.

6. Drilling member, as set forth in claim 5, wherein said corrugated surfaces each being formed of a number of teeth extending transversely of the axial direction of said stop member.

7. Drilling machine, as set forth in claim 6, wherein said teeth having flanks disposed at angles of 45° to the axis of said stop member.

8. Drilling machine, as set forth in claim 1, wherein said second portion of said continuous circumferential part of said one end surface being located between said first portion and said third portion.

9. Drilling machine, as set forth in claim 1, wherein said first portion of the continuous circumferential part of said one end surface extends chordally of the pivot axis of said handle lever and is a planar surface extending perpendicularly to the axis of said stop member.

* * * * *